(12) United States Patent
Zhang et al.

(10) Patent No.: US 9,495,979 B1
(45) Date of Patent: Nov. 15, 2016

(54) MAGNETIC RECORDING HEAD FRONT SHIELD FORMATION

(71) Applicant: Seagate Technology LLC, Cupertino, CA (US)

(72) Inventors: Xiaohong Zhang, EdenPrairie, MN (US); Wei Tian, Eden Prairie, MN (US); Zhe Shen, Lakeville, MN (US); Dong Lin, Eden Prairie, MN (US); Joseph Mundenar, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/871,597

(22) Filed: Sep. 30, 2015

(51) Int. Cl.
G11B 5/31 (2006.01)
G11B 5/127 (2006.01)
G11B 5/39 (2006.01)

(52) U.S. Cl.
CPC ........... *G11B 5/1272* (2013.01); *G11B 5/3912* (2013.01)

(58) Field of Classification Search
None
See application file for complete search history.

(56) References Cited

U.S. PATENT DOCUMENTS

| | | | | |
|---|---|---|---|---|
| 5,969,911 A * | 10/1999 | Hikami | ............... | G11B 5/3967 360/123.19 |
| 6,034,848 A * | 3/2000 | Garfunkel | ............... | G11B 5/313 360/123.39 |
| 6,462,915 B1 * | 10/2002 | Sasaki | ................... | G11B 5/3903 360/317 |
| 6,754,049 B1 | 6/2004 | Seagle et al. | | |
| 7,009,812 B2 | 3/2006 | Hsu et al. | | |
| 7,099,121 B2 * | 8/2006 | Parker | .................. | G11B 5/1278 360/317 |
| 7,724,469 B2 | 5/2010 | Gao et al. | | |
| 7,876,531 B2 | 1/2011 | Bozeman et al. | | |
| 8,339,741 B2 | 12/2012 | Zhang et al. | | |
| 8,780,497 B2 * | 7/2014 | Sasaki | ....................... | G11B 5/17 360/123.06 |
| 8,792,209 B2 | 7/2014 | Sasaki et al. | | |
| 8,873,201 B2 * | 10/2014 | Benakli | ..................... | G11B 5/11 360/235.4 |
| 9,159,349 B2 * | 10/2015 | Peng | ..................... | G11B 5/6076 |
| 2002/0064003 A1 * | 5/2002 | Kim | .......................... | G11B 5/11 360/125.72 |
| 2003/0227714 A1 * | 12/2003 | Parker | .................. | G11B 5/1278 360/125.12 |
| 2005/0157423 A1 * | 7/2005 | Sasaki | ...................... | G11B 5/31 360/123.41 |
| 2008/0316631 A1 * | 12/2008 | Gao | ......................... | G11B 5/02 360/55 |
| 2009/0021861 A1 * | 1/2009 | Vas'ko | ...................... | G11B 5/02 360/122 |
| 2009/0262457 A1 * | 10/2009 | Rivkin | .................. | G11B 5/1278 360/110 |
| 2009/0262636 A1 * | 10/2009 | Xue | ........................ | G11B 5/314 369/126 |
| 2010/0254041 A1 * | 10/2010 | Alex | ..................... | G11B 5/1278 360/123.02 |
| 2010/0254042 A1 * | 10/2010 | Contreras | ............ | G11B 5/1278 360/123.05 |
| 2011/0090584 A1 * | 4/2011 | Franca-Neto | ............ | G11B 5/02 360/55 |
| 2011/0090596 A1 * | 4/2011 | Franca-Neto | ........ | G11B 5/1278 360/125.03 |
| 2011/0128652 A1 * | 6/2011 | Taguchi | ............... | G11B 5/3133 360/123.12 |
| 2012/0188666 A1 * | 7/2012 | Sasaki | .................. | G11B 5/1278 360/123.12 |
| 2013/0201577 A1 * | 8/2013 | Lopusnik | ............... | G11B 5/312 360/75 |
| 2013/0321955 A1 | 12/2013 | Benakli et al. | | |

\* cited by examiner

*Primary Examiner* — Will J Klimowicz
(74) *Attorney, Agent, or Firm* — HolzerIPLaw, PC

(57) ABSTRACT

Implementations disclosed herein provide a method of forming a first layer of a front shield in a magnetic recording head, depositing an active shield control (ASC) device on the first layer, and forming a second layer of the front shield on top of the ASC device and the first layer of the front shield. In another implementation, an apparatus includes a write pole, and a two layer front shield formed on the write pole, including an ASC device between the two layers of the front shield.

11 Claims, 5 Drawing Sheets

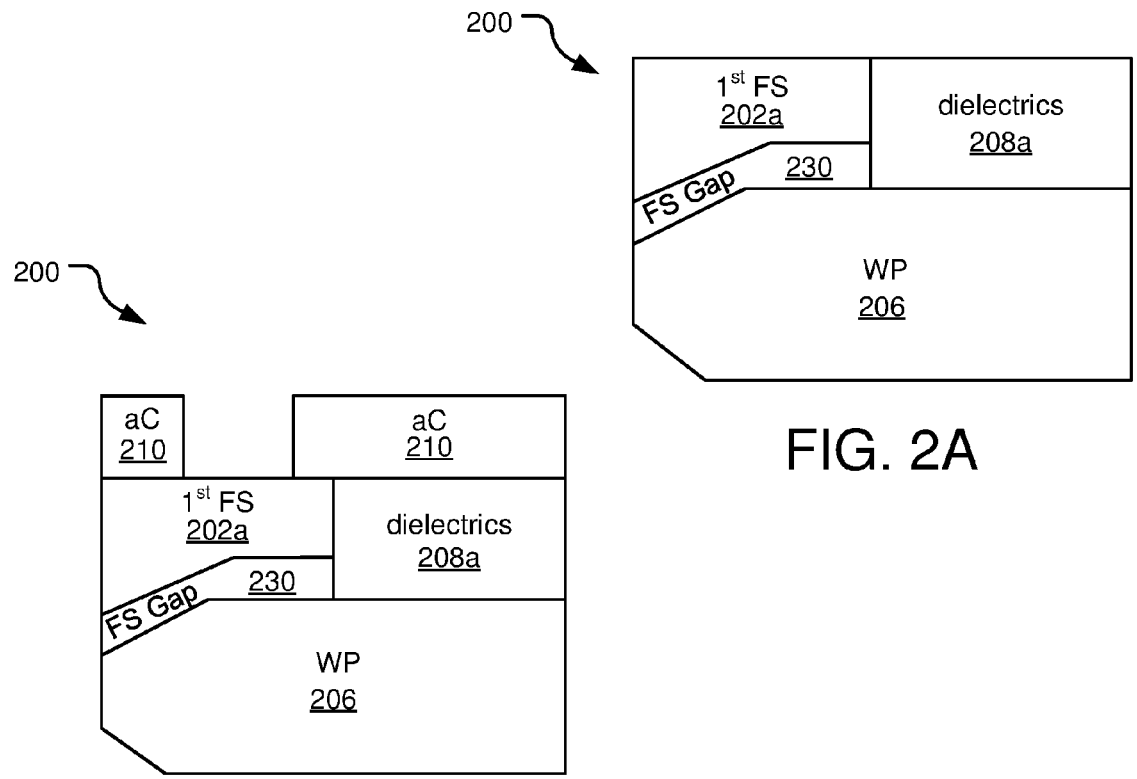
FIG. 2A
FIG. 2B
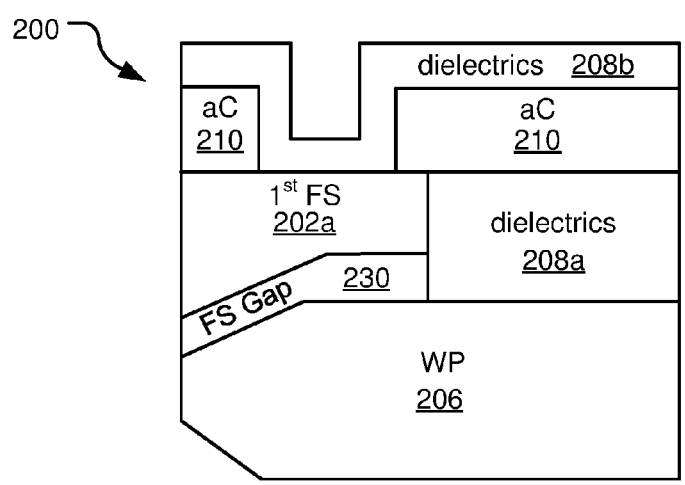
FIG. 2C

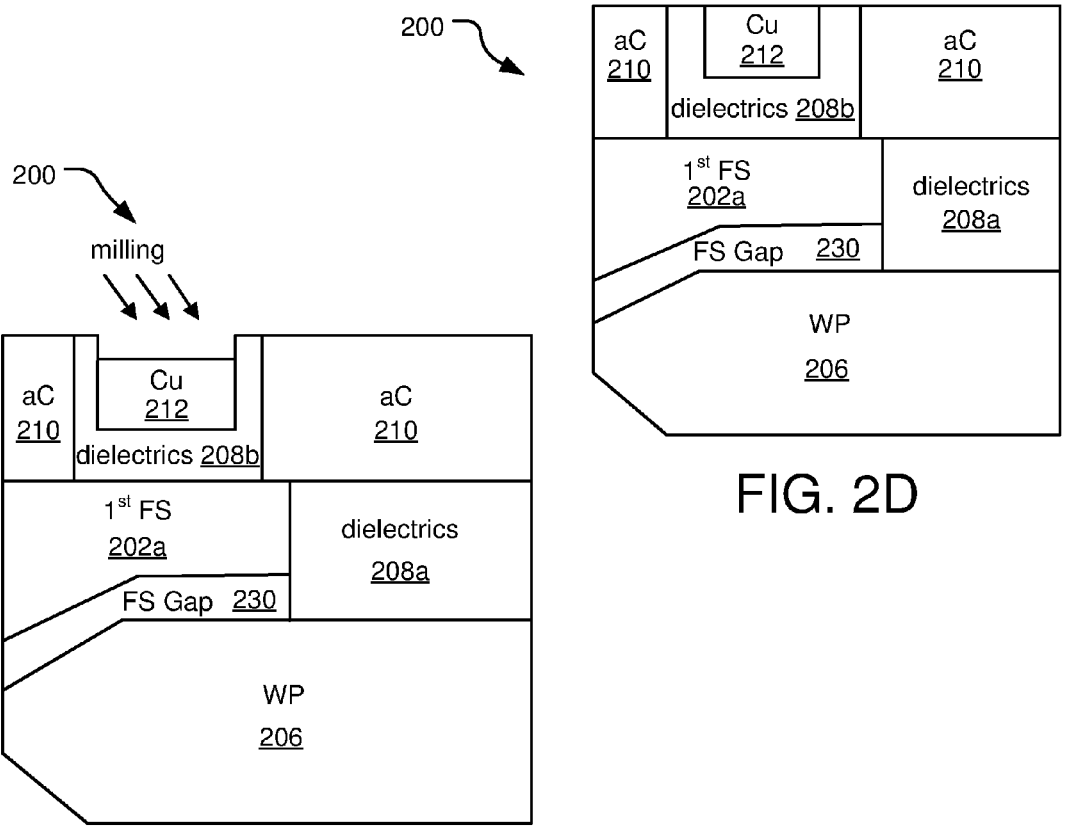
FIG. 2D
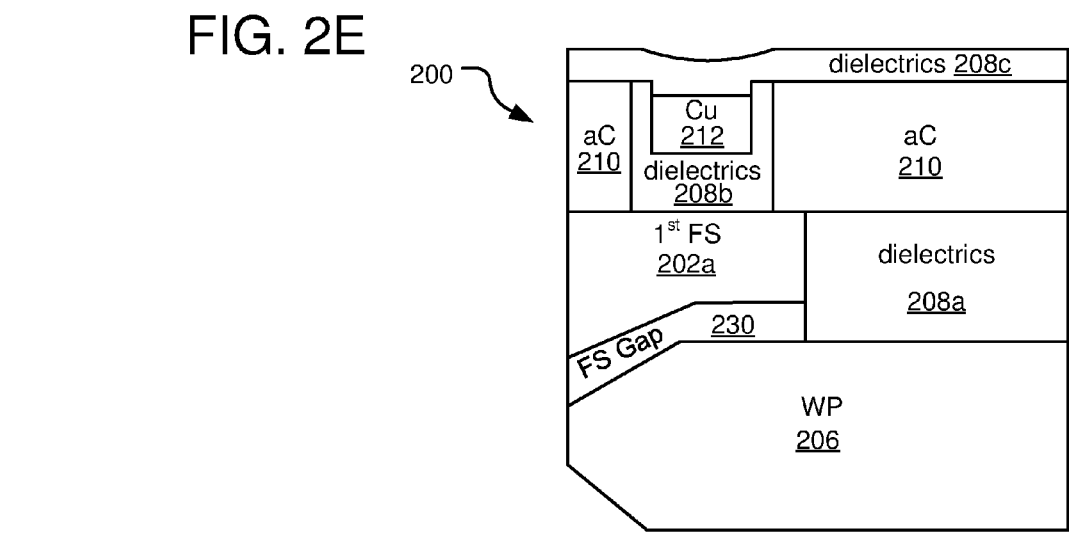
FIG. 2E
FIG. 2F

MAGNETIC RECORDING HEAD FRONT SHIELD FORMATION

BACKGROUND

A disc drive is an example of a data storage system that uses magnetic field for writing and reading data. Transducers write information to and read information from data surfaces of the discs. In one example, transducers include a recording or write head for generating a magnetic field that aligns the magnetic moments of a magnetic medium to represent desired bits of data. To ensure that the transducer write head accurately magnetizes the appropriate magnetic cells on magnetic media during write operations, the cells on the media are positioned beneath the write head and synchronized with the passing of the magnetic cells. This chronization depends not only on the write pole speed but also on how quickly the trailing or front shield can close the flux circuit, establishing the write field gradient in the process.

SUMMARY

Implementations disclosed herein provide a method of forming a first layer of a front shield in a magnetic recording head, depositing an active shield control (ASC) device on the first layer, and forming a second layer of the front shield on top of the ASC device and the first layer of the front shield. In another implementation, an apparatus includes a write pole, and a two-layer front shield formed on the write pole, including an ASC device between the two layers of the front shield.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

FIGS. 2A-2H illustrate block diagrams of a side view of an example magnetic recording head structure during a method of forming an active shield control device.

DETAILED DESCRIPTION

Magnetic data storage devices include media, wherein each data bit is magnetically stored on the media. Data is stored in the individual cells along consistent bit tracks, which are typically recorded into the storage medium at concentric radial positions (e.g., from an inner diameter to an outer diameter of the storage medium). As the storage medium rotates in a storage device, a transducer write head is positioned in close proximity to the storage medium surface along a data track to read data from and write data to the individual cells in the track.

Disc drives use an actuator for positioning the transducer head adjacent to the storage medium. A servo control system receives servo positioning information read by the write head from the data tracks, typically from equally-angularly-spaced servo sectors that extend generally radially across the tracks. The servo control system supplies control signals to the actuator to maintain the write head on track and move the write head to the desired tracks for reading and writing of data.

Synchronizing the response of the write pole to magnetomotive force (MMF) with the response of the front shield to the MMF as disclosed herein enhances write accuracy, ensuring that a magnetic write field will achieve a fast and sharp transition between two bits.

The disclosed technology includes an apparatus (e.g., a write head) having a magnetically activated two-layer front shield (FS) that enhances a dynamic field gradient of magnetic flux applied to a media via a write pole. The two-layer FS is activated by sending current to an active-shield-control (ASC) device (e.g., a copper (Cu) wire) that is embedded inside a two-layer FS. The current runs in the direction opposite or parallel to that of main coils that energize the write pole. The FS is energized at approximately the same phase or out-of-phase as the main coils. During switching of magnetic orientation, the ASC device magnetizes the FS in the direction opposite to that of the main pole at the on or out-of-phase pace, enhancing the field gradient during the transition. As a result, the ASC device synchronizes the response to the magnetomotive force (MMF) by the write pole and the FS in the magnetic recording head.

An ASC device requires electrical isolation from surrounding FS material, which can be a significant challenge during the fabrication process. The disclosed technology includes a method of forming an ASC device in the FS, which includes a dielectrics encapsulated wire that is electrically connected to coils (in either a parallel or anti-parallel way, and with or without a current shunting path) or connected to a separate circuit. The dielectric material encapsulating the wire provided electrical isolation to the wire from the FS.

Figure 1:
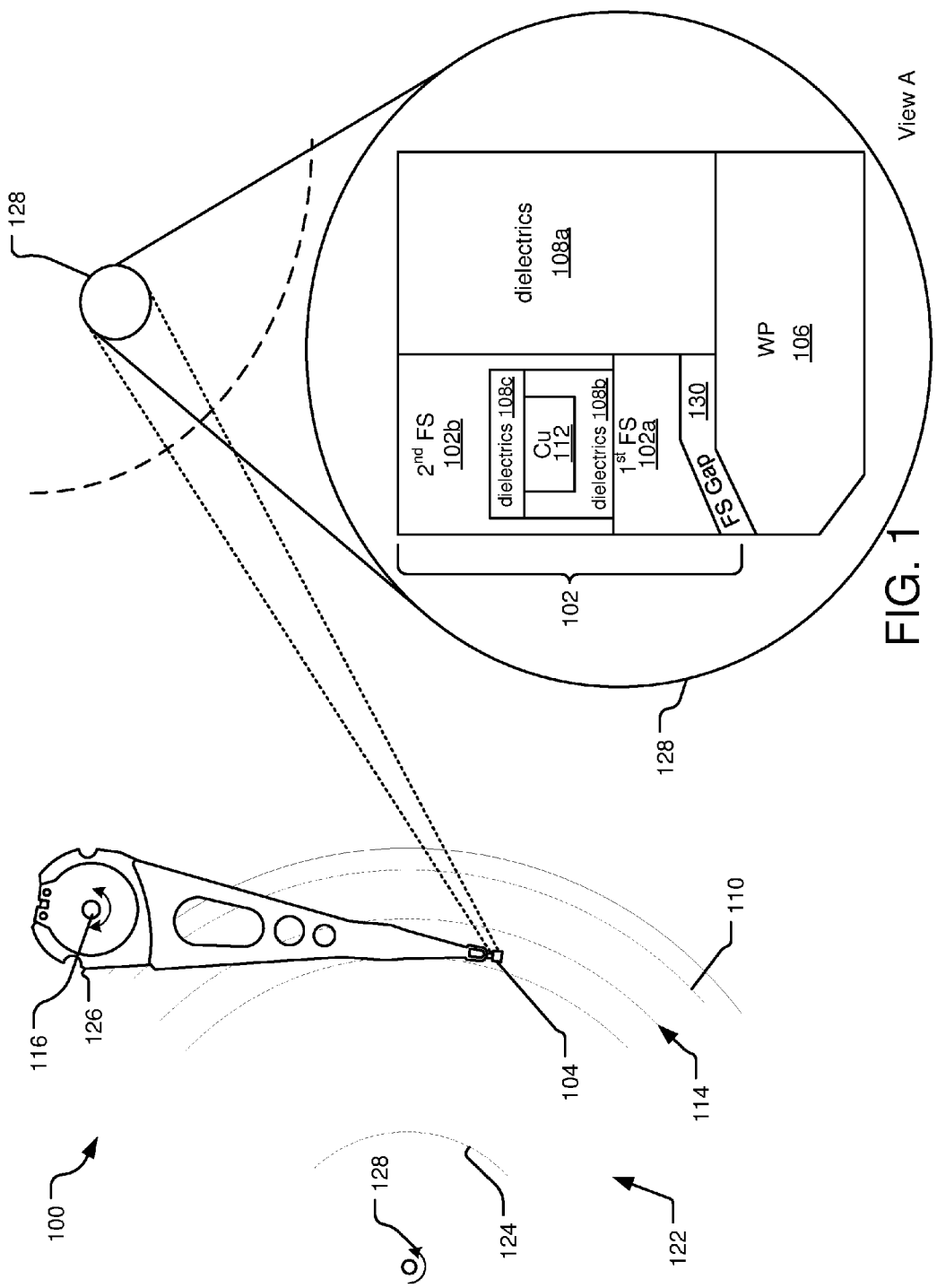
FIG. 1 illustrates a schematic block diagram illustrating an example magnetic write head structure implemented on an end of an actuator assembly.

FIG. 1 illustrates a schematic block diagram 100 illustrating an example of a write head structure implemented on an end of an actuator assembly. Specifically, FIG. 1 illustrates a plan view of an implementation of a disc 122 with a transducer head 104 situated on an end of an actuator assembly 126. Disc 122 rotates about a disc axis of rotation 128 during operation. Further, disc 122 includes an outer diameter 110 and inner diameter 124 between which are a number of data tracks 114, illustrated by circular dotted lines. Data tracks 114 are substantially circular and are made up of regularly-spaced patterned bits.

Information may be written to and read from the patterned bits on the data tracks 114 through the use of the actuator assembly 126, which rotates during a data track 114 seek operation about an actuator axis of rotation 116 positioned adjacent the disc 122. The transducer head 104 mounted on the actuator assembly 126 at an end distal the actuator axis of rotation 116 flies in close proximity above the surface of the disc 122 during disc operation. The transducer head 104 includes a read pole for reading data from the data track 114 and a write pole for writing data to the data track 114.

In an exploded View A, a cross-sectional view of a write head 128 is shown. Specifically, the write head 128 is illustrated along an air-bearing surface (ABS) 120. The write head 124 includes a write pole 106 and a two-layer FS 102 formed on the write pole 106. The two-layer FS 102 includes a first layer 102a and second layer 102b. An ASC device is located between the two layers of the FS 102. In this implementation, the ASC device is a Cu wire 112. A dielectric 108a is located away from the ABS 120 of the two-layer FS 102, and another layer of dielectric 108b encapsulates the Cu wire 112. The dielectric 108a electrically isolates the Cu wire 112 from the FS 102.

It is noted that the one or more Cu wire 112 may be used, each including one or more winding of the Cu wire 112 used to form a coil. In alternative implementations, the materials used to manufacture the Cu wire 112 may include any of a wide variety of conventional electrical conductors, including but not limited to metals such as Cu, Au, Al, W, and Mo. Other non-metal conductive materials may also be used, such as carbon nanotubes and graphene. The material may also be selected to have a small coefficient of thermal expansion so that the size can be contained even when heat is generated by the current flowing through the wire 112.

As a result of the configuration of the write head 128, the magnetically activated two-layer FS 102 enhances a dynamic field gradient of magnetic flux applied to a media via the write pole 106. FIGS. 2A-2H illustrate cross-sectional views of a portion of a write head 200 at different stages of manufacturing. Specifically, FIGS. 2A-2H show cross-sectional views of a write head 200 at various steps using a method of forming a two-layer FS 202, including a dielectrics encapsulated Cu wire 212, on a write pole 206.

In FIG. 2A, a cross-sectional view of the write head 200 is shown. A first layer 202a of a FS is plated on top of the write pole 206 with separation by the front shield gap 230. Dielectrics 208a are deposited on top of the write pole 206 adjacent or directly on top of the first layer 202a of the FS, then followed by a chemical mechanical planarization (CMP) process to planarize the first layer 202a of the FS and the adjacent dielectrics.

In one implementation, the FS 202 materials include $Ni_{1-x}Fe_x$ and $Co_x(Ni_yFe_{1-y})_{1-x}$. The isolation dielectrics 208a-c described in this disclosure include, but are not limited to, $Al_2O_3$ or $SiO_2$. The deposition techniques for the dielectrics 208 include atomic layer deposition (ALD), chemical vapor deposition (CVD), metal organic chemical vapor deposition, sputtering, and electrical beam deposition/vaporization (MOCVD), and e-beam deposition/evaporation.

In FIG. 2B, a cross-sectional view of the write head 200 is shown. An aC(amorphous Carbon) mold 210 is fabricated by a photo patterning and an inductively coupled plasma (ICP) etching process on the top surface of the first layer 202a of the FS 202, which is located on top of the write pole 206, and on the dielectrics 208a. The aC mold serves three purposes. First, the aC mold provides large critical dimension (CD), which is of less challenge for photo lithography to process. Second, the mold predefines the wire shape. After the deposition of the dielectrics and the plating of Cu material into the aC mold, the Cu wire is formed by a planarization process, such as CMP process. Third, the aC material serves as the CMP stop during the planarization of the Cu wire.

The patterning process includes a photo lithography technique to pattern the wire shape with the photo resist applied on the aC deposited on top of the planarized FS and the deposited dielectric surface. ICP is performed to etch away the aC material that is exposed or not covered by the photo resist while keeping the aC material that is masked by the photo resist. After stripping the photo resist off, the remaining surface is aC with trenches where the material is removed by the ICP process. A resulting trench provides an area for the Cu wire and the surrounding isolation dielectrics materials. The aC in the trench is completely removed so the first layer 202a of the FS is exposed.

In FIG. 2C, a cross-sectional view of the write head 200 is shown. A layer of isolation dielectrics 208b is deposited on the top surface of the aC mold 210 and a remaining exposed area of the first layer 202a of the FS. The dielectrics 208b are deposited to isolate an ASC device from the first layer 202a (or the bottom FS) and side FS material shields (not shown).

In FIG. 2D, a cross-sectional view of the write head 200 is shown. Dielectrics 208a are located between the aC mold 210 and the first layer 202a of the FS 202. Dielectrics 208b are located between the first layer 202a of the FS and the Cu wire 212. The Cu wire 212 is plated inside the dielectrics 208b. A Cu thin film or seed is deposited as the plating seed. The Cu seed is in the range of 20 nm to 100 nm. The width of the Cu wire is approximately 10 nm-1 um.

Planarization of the Cu wire 212 is performed, the same time the dielectric on top of AC from FIG. 2C is also polished off. As a result, the Cu wire 212 top surface is exposed and at the same horizontal level of the surface of aC 210.

In one implementation, a method for forming and planarizing features in magnetic heads, known as a damascene process, etches a pattern into a planar removable aC, and then fills the pattern with dielectric layer 208b and metal, such as Cu to form the Cu wire 212. Excess metal is applied over a top surface of the dielectric layer 208b. The excess metal is then removed by CMP, until the dielectric is re-exposed and the patterned metal surface of the Cu wire 212 remains.

In FIG. 2E, a cross-sectional view of the write head 200 is shown. Dielectrics 208a are located between the aC mold 210 and the first layer 202a of the FS 202. Dielectrics 208b are located between the first layer 202a of the FS and the Cu wire 212. The dielectrics 208b electrically isolates the Cu wire 212 from the FS 202a. A milling or a dryetching operation is performed to create a recessed Cu wire 212 with a planar surface in the first layer 202a of the FS formed on top of the write pole 206. In some implementations, such reduction by the milling or dryetching can generate a desired topography along the air bearing surface of the Cu wire 212 from approximately 1 nm to 1 um. The recovery milling or dryetching process results in a void above the Cu wire 212.

The milling or dryetching process can be performed in predetermined angles and at different removing rates. The angles and/or removing rates can be selected based on a variety of factors. In one implementation, a predetermined angle and removing rate can be based on selectivity for a specific material (e.g., Cu, alumina, amorphous carbon, etc.) of the ASC device such as the Cu wire 212. In another implementation, a predetermined angle and/or removing rate can be based on a desired condition. For example, a predetermined angle can be based on the level of redisposition of Cu material on the side, which is aluminum oxide (the redeposited material potentially weakens the ASC wire isolation). In yet another example, a predetermined angle can be based on uniformly recessing Cu wire 212 material without a concave or convex Cu surface profile, which is not desired for Cu isolation.

In FIG. 2F, a cross-sectional view of the write head 200 is shown. Dielectrics 208a are located between the aC mold 210 and the first layer 202a of the FS 202. Dielectrics 208b are located between the first layer 202a of the FS and the Cu wire 212. A deposition operation is performed to add additional dielectrics 208c on top of the recessed Cu wire 212, dielectrics 208b and the aC mold 210. As a result, dielectrics 208b and 208c fully encapsulate the Cu wire 212 to provide electrical isolation from surrounding FS materials (in FIG. 2F, the first layer 202a of the FS is shown).

Figure 2G:
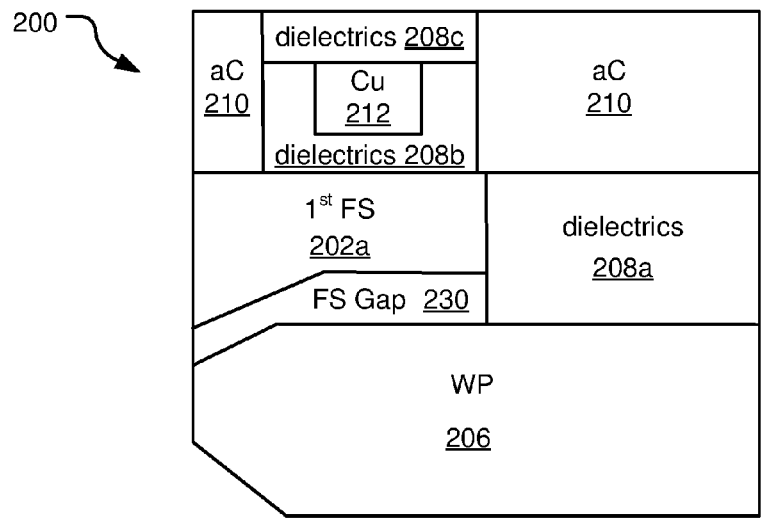

In FIG. 2G, a cross-sectional view of the write head 200 is shown. Planarization of the dielectrics 208c on top of the recessed Cu wire 212 is performed by CMP. The planarization results in a flat surface extending over the aC mold 210 and the dielectrics 208c encapsulating the Cu wire 212.

Figure 2H:
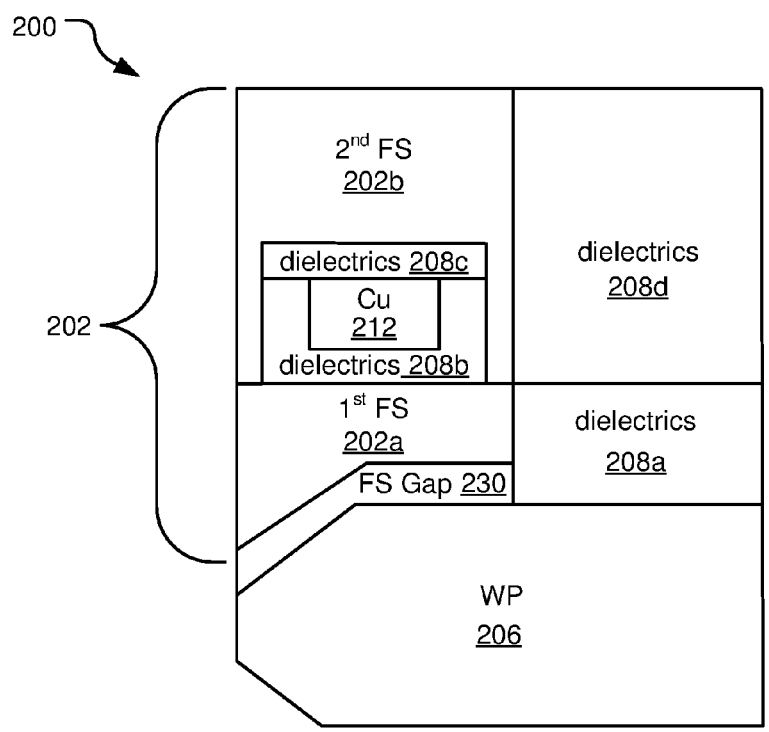

In FIG. 2H, a cross-sectional view of the write head 200 is shown. The aC mold 210 (shown in FIG. 2G) is removed by an ashing or an ICP process, and a second layer 202b of the FS is plated on top of the dielectric encapsulated Cu wire 212 and first layer 202a of the FS, resulting in a two-layer FS 202. The first layer 202a and the second layer 202b of the FS 202 fully embed the Cu wire 212 inside the FS 202. The second layer 202b of the FS 202 is also adjacent and directly attached to dielectrics 208a, 208b, and 208c. The Cu wire 212 can be electrically connected to the coil or a separate circuit by Cu leads (not shown). Then, dielectrics 208d are deposited, followed by another CMP process to planarize the surface.

Figure 3:
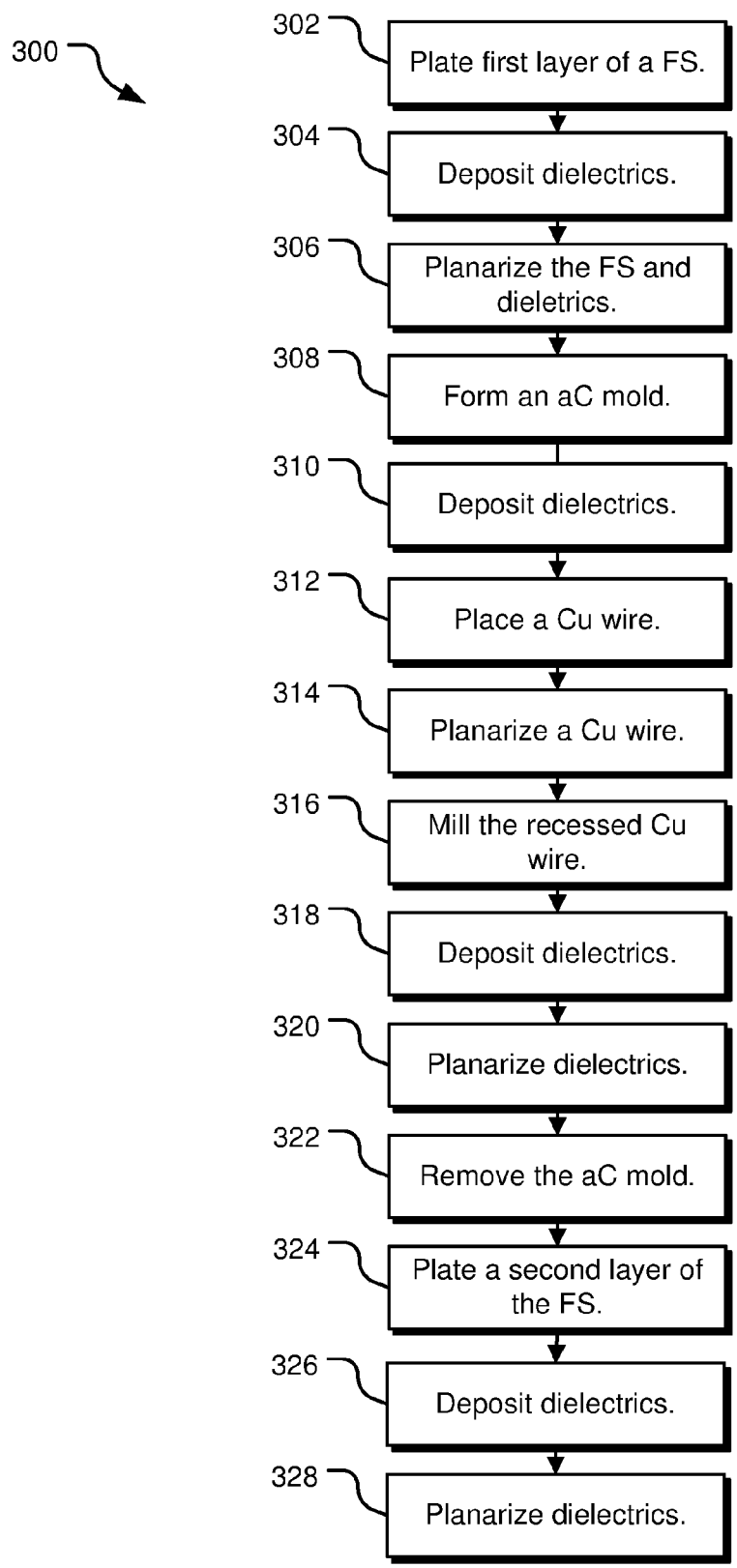
FIG. 3 illustrates example operations of forming an active shield control device.

FIG. 3 illustrates example operations for forming an ASC device in the FS. Specifically, the resulting ASC device of this manufacturing method includes a dielectrics encapsulated copper (Cu) wire that is electrically connected to coils (in either a parallel or anti-parallel way, and with or without a current shunting path) or connected to a separate circuit.

A plating operation 302 plates a first layer of the FS on top of the write pole with a separation by the FS gap. Backfill dielectrics and a following CMP process create a planar surface. The FS materials include $Ni_{1-x}Fe_x$ and $Co_x(Ni_yFe_{1-y})_{1-x}$.

A deposition operation 304 deposits, dielectrics on top of the write pole adjacent or directly attached to the first layer of the FS. The isolation dielectrics described in this disclosure include, but are not limited to, $Al_2O_3$ or $SiO_2$. The deposition techniques for the dielectrics include ALD, CVD, MOCVD, sputtering, and e-beam deposition/evaporation. A planarizing operation 306 planarizes the FS and the dielectrics.

A forming operation 308 forms an aC mold in two separate areas. A first portion of a removable aC mold is formed by a photo patterning and ICP process on the top surface of the first layer of the FS. A second portion of the aC mold is formed on the top surface of the first layer of the FS and the dielectrics.

A depositing operation 310 deposits, isolation dielectrics on the top surface of the two portions of the aC mold and a remaining exposed area of the first layer of the FS.

A plating operation 312 is performed on top of the remaining exposed area of the dielectrics deposited on the first layer of the FS.

A planarization operation 314 is performed on the aC mold and on top of the remaining exposed area of the first layer of the FS by CMP.

A milling or a dryetching operation 316 creates a recessed Cu wire. In some implementations, such reduction by the milling or dryetching can decrease the topography of the Cu wire from approximately 1 nm to 1 um. The recovery milling or dryetching process results in a void above the Cu wire.

The milling or dryetching process can be performed in predetermined angles. The angles can be selected based on a variety of factors. For example, a predetermined angle can be based on level of selectivity for Cu, alumina, and aC. In another example, a predetermined angle can be based on level of redeposition of Cu material on the side, which is aluminum oxide (the redeposited material potentially weakens the ASC wire isolation). In yet another example, a predetermined angle can be based on uniformly recessing Cu material without a concave or convex Cu surface profile, which is not desired for Cu isolation.

A depositing operation 318 deposits, dielectrics on top of the recessed Cu wire. As a result, dielectrics fully encapsulate the Cu wire to provide electrical isolation from surrounding FS materials.

A planarization operation 320 by CMP provides a flat surface of the dielectrics on top of the recessed Cu wire. In a removing operation 322, the aC mold is removed.

In a final plating operation 324, a second layer of the FS is plated on top of the dielectric encapsulated Cu wire and first layer of the FS. The second layer of the FS fully embeds the Cu wire inside the FS. The second layer of the FS is also adjacent and directly attached to dielectrics formed on top of the write pole. The Cu wire can be electrically connected to the coil or a separate circuit by Cu leads (not shown). Then, dielectrics 208d are deposited, in a depositing operation 326 by another CMP process to provide a flat surface of the dielectrics. In a planarizing operation 328, the surface is planarized.

Implementations described above for actively synchronizing a magnetic response of a shield and a write pole provide high-efficiency write operations, e.g., using a thin-film coil wire operatively associated with an inductive write head at the air-bearing surface. The high flux density from the coil wire magnetizes the write pole. The field profile from the coil wire maps onto that of the write pole to yield enhanced field gradients that exceed the capability of current technology, and the design can be readily fabricated and manufactured using common, low complexity materials and processing techniques.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method comprising:
   forming a first layer of a front shield in a magnetic recording head;
   depositing a first dielectric material onto the first layer of the front shield;
   forming an active shield control (ASC) device on the first dielectric material configured to synchronize the response to a magnetomotive force (MMF) of a write pole and the front shield; depositing a second dielectric material on the ASC device; and
   forming a second layer of the front shield directly on top of the second dielectric material, and the first layer of the front shield.

2. The method of claim 1, further comprising forming an amorphous carbon mold on the first layer of the front shield.

3. The method of claim 2, further comprising removing the amorphous carbon mold on the first layer of the front shield.

4. The method of claim 1, further comprising one or both of milling or dryetching the ASC device.

5. The method of claim 4, wherein the one or both of milling or dryetching the ASC device is performed at predetermined angles selected based on selectivity for a specific material of the ASC device.

6. The method of claim 5, further comprising depositing a third dielectric material on a write pole adjacent to the first layer of the front shield and a fourth dielectric material on the third dielectric material adjacent to the second layer of the front shield.

7. The method of claim 1, wherein depositing the first dielectric material is performed by at least one of atomic layer deposition, chemical vapor deposition, metal organic chemical vapor deposition, sputtering, and electrical beam deposition/vaporization.

8. A method comprising:
   forming a first layer of a front shield in a magnetic recording head;
   depositing a first alumina onto the first layer of the front shield;
   depositing an active shield control (ASC) device on the alumina, the ASC device including a copper wire and configured to synchronize the response to a magnetomotive force (MMF) of a write pole and the front shield;
   depositing a second alumina onto the copper wire; and
   forming a second layer of the front shield directly on top of the second alumina and the first layer of the front shield.

9. The method of claim 8, further comprising one or both of milling or dryetching the copper wire.

10. The method of claim 8, forming an amorphous carbon mold on the first layer of the front shield.

11. The method of claim 10, further comprising removing the amorphous carbon mold on the first layer of the front shield.

* * * * *